Patented Jan. 15, 1929.

1,698,894

UNITED STATES PATENT OFFICE.

KARL SCHIRMACHER AND KONRAD RENN, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS OF PREPARING ISATINS.

No Drawing. Application filed January 27, 1927, Serial No. 164,120, and in Germany January 28, 1926.

Our present invention relates to isatins and N-arylsulfo compounds thereof.

We have found that isatins or N-arylsulfo compounds thereof can be obtained by causing oxalyl chloride to act upon a salt of an N-arylsulfoanilide, or a homologue, a derivative or a substitution product thereof, in the presence of an indifferent diluent, and treating the oxamic acid chlorides thus obtained, which can be isolated also in substance, with an acid condensing agent as for instance aluminium chloride. Thus N-arylsulfo compounds of the isatins are produced being well-characterized bodies which, when treated with a saponifying agent as for instance concentrated sulfuric acid, are transformed even in the cold into the corresponding isatins. By this process isatins can be prepared which could heretofore be obtained only with great difficulty or not at all. The reaction takes place according to the following scheme:

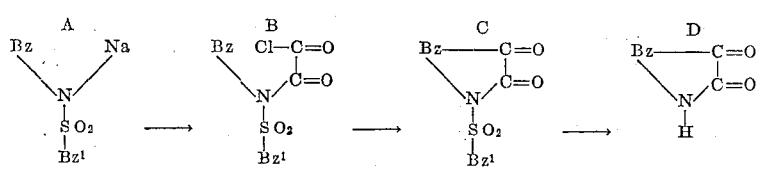

In the foregoing formulæ Bz and $Bz^1$ stand for aromatic nuclei substituted or not but the Bz nuclei of formulæ A and B has at least one of the ortho-positions to the nitrogen unsubstituted.

The following examples serve to illustrate our invention but they are not intended to limit it thereto:

1. Into a mixture prepared from 200 parts by volume of carbon disulfide and 14 parts by weight of oxalyl chloride are introduced, while cooling with ice, 28.3 parts by weight of the sodium salt of para-toluenesulfo-para-toluidide of the formula:

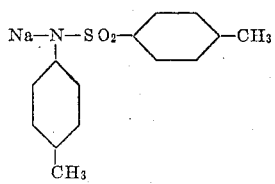

and the mass is then heated to boiling for a few minutes in order to complete the reaction. In order to obtain the N-para-toluenesulfo-N-para-tolyl-oxamic acid chloride the sodium chloride is filtered off. The filtrate is then concentrated and the colorless crystals thus obtained are filtered by suction. The acid chloride is rather unstable towards water. It corresponds to the formula:

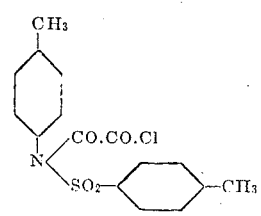

By crystallization from low boiling naphtha benzene it forms coarse colorless crystals having a melting point of 91° to 93° C., which are easily soluble in the usual solvents. The pure compound is quite stable to air.

The preparation of the N-para-toluenesulfo-5-methylisatin does, however, not require the isolation of the acid chloride. For this purpose 27 parts by weight of powdered aluminium chloride are introduced into the solution obtained by the above-described reaction with carbon disulfide after having again cooled the solution with ice; this mixture is heated to boiling within a quarter of an hour, and boiling is continued until the evolution of hydrogen chloride is finished. The reaction product is poured into a mixture prepared from about 580 parts of water and 50 parts by volume of concentrated hydrochloric acid, whereupon the carbon disulfide is distilled off on the vapour bath. The residual solution is heated for some minutes so that it boils strongly and the intensely yellow N-para-toluenesulfo-5-methylisatin thus obtained is then filtered by suction. It is purified by recrystallizing it from a small quantity of benzene or glacial acetic acid. It melts at 202–205° C. It has the probable formula:

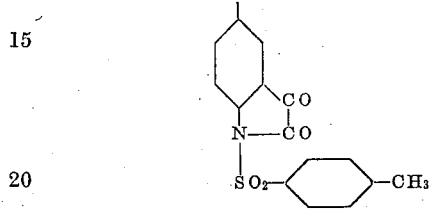

In order to transform it into the 5-methylisatin the substance after being powdered is dissolved in concentrated sulfuric acid, wherein it is soluble to a red solution. The mass is allowed to stand for about 24 hours, and is then poured into water whereby the known methylisatin of the melting point 182–184° C. is precipitated in a pure state. It has the probable formula:

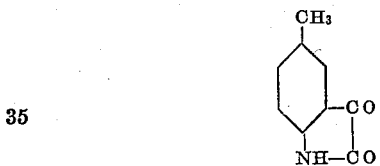

2. If for the sodium salt of para-toluene-sulfo-para-toluidide used in Example 1 is substituted the same quantity of the sodium salt of para-toluenesulfo-meta-toluidide of the probable formula:

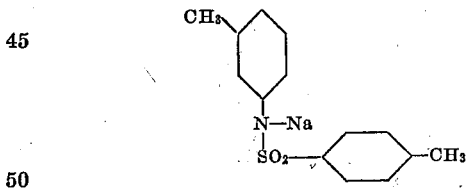

there is obtained a mixture of N-para-toluene-sulfo-4-methylisatin of the probable formula:

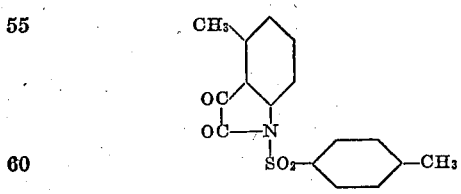

and N-para-toluenesulfo-6-methylisatin of the probable formula:

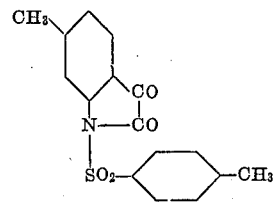

which, after recrystallization from a small quantity of glacial acetic acid, forms intensely yellow, well-defined crystals of the melting point of 161–163° C. It dissolves in the heat in most of the usual solvents and forms on cooling well-shaped crystals. The toluenesulfo residue is split off as indicated in Example 1. The final product also dissolves in concentrated sulfuric acid to a red solution. After being recrystallized from xylene the mixture of 4- and 6-methylisatin melts at 143–145° C. of the probable formulæ:

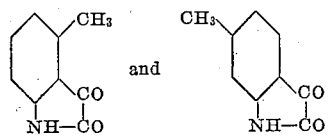

3. Into a mixture prepared from 200 parts by volume of carbon disulfide and 14 parts by weight of oxalyl chloride are introduced, while cooling with ice, 32 parts by weight of the sodium salt of para-toluenesulfo-α-naphthylamide of the probable formula:

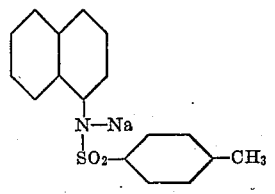

and the mixture is heated for half an hour to gentle boiling, in order to complete the conversion. There are then added thereto, while again cooling with ice, 40 parts by weight of aluminium chloride and heated to boiling for half an hour during which operation a strong evolution of hydrogen chloride sets in, and boiling is continued for half an hour. The mass is then decomposed with ice and concentrated hydrochloric acid, freed from the carbon disulfide, and the product thus obtained is boiled up for a short time with a mixture prepared from 1000 parts of water and 25 parts by volume of caustic soda solution of 40° Bé. The undissolved, colorless body is filtered off by suction and the red filtrate is acidified with concentrated hydrochloric acid so that it gives an acid reaction towards Congo paper.

From the precipitating brownish-yellow product there can be obtained, by recrystallization from for instance nitrobenzene, the 1.8-naphthisatin which forms olive needles having its melting point over 300° C. It has the probable formula:

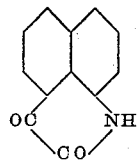

The 1.8-naphthisatin dissolves in alkali and sodium carbonate to an intensely red solution which remains so on boiling, in concentrated sulfuric acid to a reddish-yellow solution. As this naphthisatin is not identical with the known 1.2-naphthisatin it must be assumed that it has the constitution of 1.8.

4. If for the sodium salt of para-toluenesulfo-para-toluidide used in Example 1 are substituted 32 parts by weight of the sodium salt of para-toluenesulfo-3-chloro-4-toluidine of the probable formula:

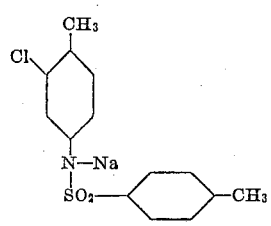

and the further operations are carried out as indicated in Example 1, there is obtained, after having filtered off the sodium chloride by suction, a solution of N-para-toluenesulfo-N-3-chloro-para-tolyl-oxamic acid chloride, which body can be isolated in the manner indicated in Example 1 and has the same properties as the N-para-toluenesulfo-N-para-tolyl-oxamic acid chloride described in Example 1. It corresponds to the formula:

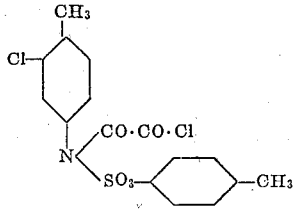

By crystallization from low boiling naphtha benzene, it forms coarse colorless crystals having a melting point of 82° to 85° C. In a pure state it is quite stable to air. By repeated recrystallization it is gradually decomposed. It is very easily soluble in ether, chloroform, benzene, carbondisulfide and other solvents.

By causing aluminium chloride to act upon the product thus obtained by the reaction with carbon disulfide, and decomposing the reaction product with water and concentrated hydrochloric acid, an intensely yellow substance is obtained which consists of a mixture of N-para-toluenesulfo-5-methyl-6-chlorisatin and N-para-toluenesulfo-5-methyl-4-chlorisatin of the probable formulæ:

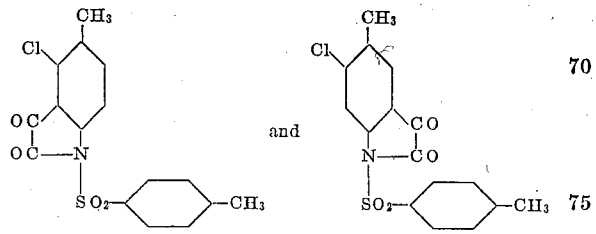

In order to purify the mixture, it may be recrystallized from glacial acetic acid. Its melting point is between 180–190° C. (not sharply).

For the purpose of saponifying, the crude product is first well washed, dried and finely powdered and then dissolved in 75 parts by volume of concentrated sulfuric acid and this solution, after having been allowed to stand for 24 hours, is poured into 600 parts of water. The precipitating mixture of 5-methyl-6-chlorisatin and 5-methyl-4-chlorisatin of the probable formulæ:

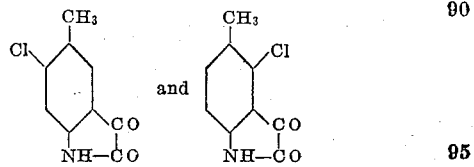

is filtered off by suction, washed, and dissolved, while boiling, in 150 parts of water and 10 parts by volume of caustic soda solution of 40° Bé. specific gravity; the mass is freed by filtration from any small quantity of undissolved colorless matter which may be present, and the filtrate is introduced, while stirring, into hot diluted hydrochloric acid. The product which precipitates is recrystallized from alcohol and then forms red fine needles. It is soluble in cold diluted caustic soda solution to a blackish-violet solution which, when the solution is allowed to stand for some time disappears slowly, but quickly when heated.

The sodium salt of para-toluenesulfo-3-chloro-4-toluidine which has not yet been known is obtained in a good yield by fusing molecular quantities of 2-chloro-4-toluidine and para-toluenesulfo chloride with anhydrous sodium acetate and recrystallizing the reaction product from alcohol. It melts at 141–142° C.

We claim:

1. In a process of preparing isatins the step which comprises causing oxalyl chloride to act upon compounds of the general formula:

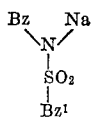

wherein Bz and Bz¹ stand for aromatic nuclei substituted or not, but in the Bz-nucleus at least one of the ortho-positions to the nitrogen being unsubstituted.

2. The process of preparing isatins which consists in causing oxalyl chloride to act upon compounds of the general formula:

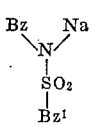

wherein Bz and Bz¹ stand for aromatic nuclei substituted or not, but in the Bz-nucleus at least one of the ortho-positions to the nitrogen being unsubstituted, converting the oxamic acid chlorides thereby formed of the formula:

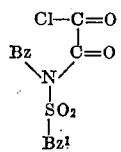

wherein Bz and Bz¹ stand for aromatic nuclei substituted or not, but in the Bz-nucleus at least one of the ortho-positions to the nitrogen being unsubstituted, into N-arylsulfoisatins by means of an acid condensing agent and then saponifying the N-arylsulfoisatins.

3. In a process of preparing isatins the step which comprises causing oxalyl chloride to act upon compounds of the formula:

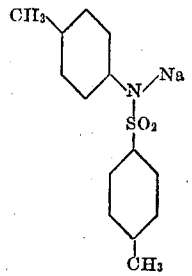

4. The process of preparing isatins which consists in causing oxalyl chloride to act upon compounds of the formula:

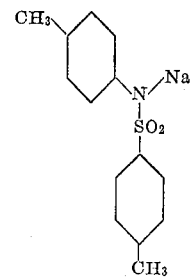

converting the oxamic acid chlorides thereby formed of the formula:

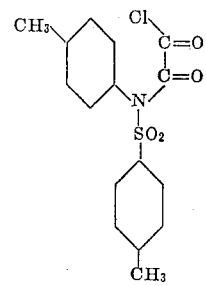

into N-arylsulfoisatins by means of an acid condensing agent and then saponifying the N-arylsulfoisatins.

5. As new products compounds of the general formula:

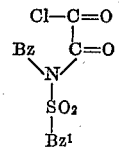

wherein Bz and Bz¹ stand for aromatic nuclei substituted or not, but in the Bz-nucleus at least one of the ortho-positions to the nitrogen being unsubstituted.

6. As a new product the compound of the following formula:

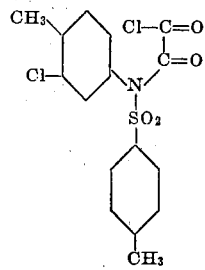

being rather unstable towards water, having the usual properties of the acid chlorides, forming by recrystallization from low-boiling naphtha benzene coarse colorless crystals having a melting point of 82° to 85° C., being easily soluble in ether, chloroform, benzene, carbondisulfide and other solvents, in its pure state being quite stable to air, and gradually decomposing upon repeated recrystallization.

7. In a process of preparing isatins the step which comprises causing oxalyl chloride to act upon compounds of the formula:

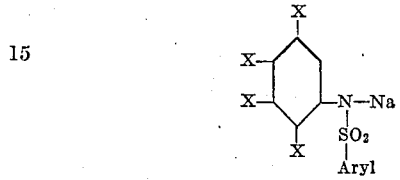

wherein X represents hydrogen or a monovalent substituent and the aryl nucleus may be substituted.

8. The process of preparing isatins which consists in causing oxalyl chloride to act upon compounds of the general formula:

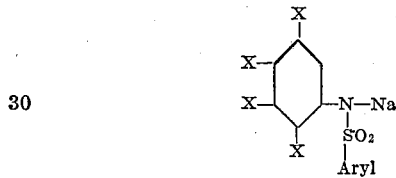

wherein X represents hydrogen or a monovalent substituent and the aryl nucleus may be substituted, converting the thus-produced oxamic acid chlorides of the formula:

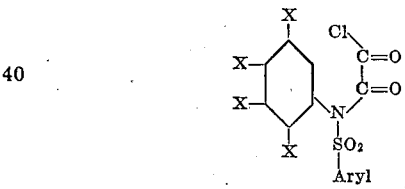

into N-arylsulfoisatins by means of acid condensing agents and then saponifying the N-arylsulfoisatins.

9. As new products compounds of the general formula:

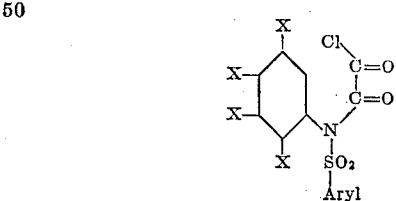

wherein X represents hydrogen or a monovalent substituent and the aryl nucleus may be substituted.

10. As new products compounds of the general formula:

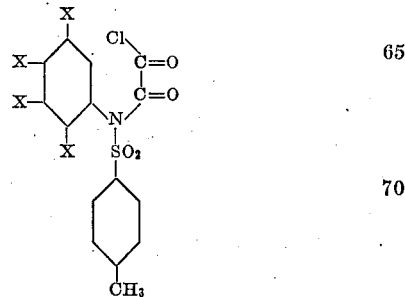

wherein X represents hydrogen or a monovalent substituent.

11. As new products compounds of the general formula:

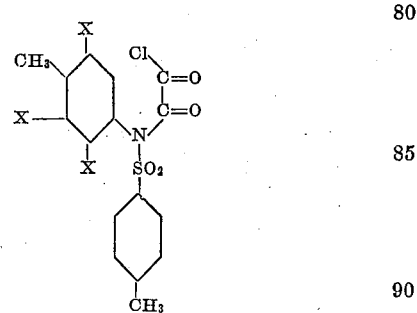

wherein X represents hydrogen or a monovalent substituent.

12. As new products compounds of the following formula:

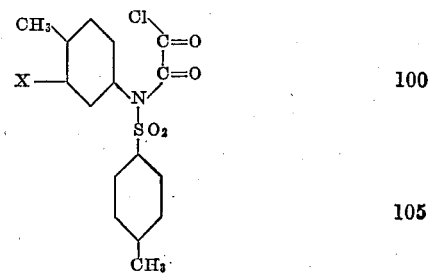

wherein X represents halogen.

In testimony whereof, we affix our signatures.

KARL SCHIRMACHER.
KONRAD RENN.